United States Patent
Pasupuleti

(10) Patent No.: US 11,636,103 B2
(45) Date of Patent: *Apr. 25, 2023

(54) EARLY GROUPING OPTIMIZATION FOR SQL STATEMENTS WITH CONDITIONAL EXPRESSIONS

(71) Applicant: ORACLE INTERNATIONAL CORPORATION, Redwood Shores, CA (US)

(72) Inventor: Krishna Kantikiran Pasupuleti, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,268

(22) Filed: Nov. 25, 2020

(65) Prior Publication Data

US 2022/0164340 A1    May 26, 2022

(51) Int. Cl.
*G06F 16/242*   (2019.01)
*G06F 16/28*    (2019.01)
*G06F 16/2453*  (2019.01)
*G06F 16/2455*  (2019.01)

(52) U.S. Cl.
CPC ........ *G06F 16/244* (2019.01); *G06F 16/2456* (2019.01); *G06F 16/24534* (2019.01); *G06F 16/287* (2019.01)

(58) Field of Classification Search
None
See application file for complete search history.

(56) References Cited

U.S. PATENT DOCUMENTS

| 5,598,559 | A  | 1/1997 | Chaudhuri |
| 5,897,632 | A  | 4/1999 | Dar et al. |
| 6,535,872 | B1 | 3/2003 | Castelli et al. |

(Continued)

OTHER PUBLICATIONS

Fender et al., U.S. Appl. No. 16/797,507, filed Feb. 21, 2020, Non-Final Rejection dated Oct. 18, 2021.

(Continued)

*Primary Examiner* — Augustine K. Obisesan
(74) *Attorney, Agent, or Firm* — Hickman Becker; Bingham Ledesma LLP

(57) ABSTRACT

To increase the applicability of group-by placement (GBP) transformations, according to embodiments described herein, database objects referred to in the aggregate function expression of a query are analyzed to determine whether any of these database objects are referred to exclusively within a condition check portion of the aggregate function expression. Such database objects may be dealt with differently (i.e., with respect to inclusion in GBP views) than the rest of the database objects referred to in aggregate function expressions of the query. This distinction between (a) aggregation-condition database objects exclusively found in condition check portions of an aggregate function expression and (b) aggregation-source database objects within an aggregate function expression allows application of GBP transformation to a wider variety of queries and also increases the possible GBP states that can be costed for GBP transformation-eligible queries.

18 Claims, 8 Drawing Sheets

400

402 IDENTIFY A PLURALITY OF STATES FOR THE PARTICULAR QUERY, WHEREIN EACH STATE, OF THE PLURALITY OF STATES, ASSIGNS EACH DATABASE OBJECT, OF THE PLURALITY OF QUERY DATABASE OBJECTS, TO ONE OF A PAIR OF DATABASE OBJECT SETS COMPRISING: A COALESCE SET AND A FACTOR SET, WHEREIN A PARTICULAR COALESCE SET OF A PARTICULAR STATE, OF THE PLURALITY OF STATES, INCLUDES (A) THE ONE OR MORE AGGREGATION-SOURCE DATABASE OBJECTS, AND (B) LESS THAN ALL AGGREGATION-CONDITION DATABASE OBJECTS OF THE ONE OR MORE AGGREGATION-CONDITION DATABASE OBJECTS

404 GENERATE A REWRITTEN QUERY THAT APPLIES EARLY GROUPING, BEFORE APPLYING THE PARTICULAR JOIN EXPRESSION, FOR AT LEAST ONE DATABASE OBJECT SET OF THE PAIR OF DATABASE OBJECT SETS IDENTIFIED BY THE PARTICULAR STATE

(56) References Cited

U.S. PATENT DOCUMENTS

| | | | |
|---|---|---|---|
| 7,379,933 B1* | 5/2008 | Witkowski | G06F 16/24537 707/999.005 |
| 10,740,333 B1 | 8/2020 | Betawadkar-Norwood et al. | |
| 11,099,902 B1 | 8/2021 | Matthews et al. | |
| 2008/0306903 A1 | 12/2008 | Larson et al. | |
| 2009/0055349 A1* | 2/2009 | Ahmed | G06F 16/24537 |
| 2009/0055350 A1 | 2/2009 | Branish, II et al. | |
| 2015/0234888 A1* | 8/2015 | Ahmed | G06F 16/2425 707/765 |
| 2015/0293968 A1 | 10/2015 | Dickie | |
| 2016/0378827 A1* | 12/2016 | Bondalapati | G06F 16/24542 707/718 |
| 2017/0329823 A1* | 11/2017 | Attaluri | G06F 16/24542 |
| 2018/0018375 A1 | 1/2018 | Brunel et al. | |
| 2018/0018383 A1 | 1/2018 | Brunel et al. | |
| 2020/0372029 A1* | 11/2020 | Betawadkar-Norwood | G06F 16/24556 |
| 2020/0401581 A1 | 12/2020 | Eubank et al. | |
| 2021/0263930 A1 | 8/2021 | Fender | |
| 2022/0164353 A1 | 5/2022 | Pasupuleti | |

OTHER PUBLICATIONS

Pasupuleti, U.S. Appl. No. 17/105,255, filed Nov. 25, 2020, Non-Final Rejection dated Feb. 3, 2022.

Weipeng P. Yan and Per-Ake Larson. "Eager Aggregation and Lazy Aggregation", VLDB 1995, 13 pages.

S. Chaudhuri and K. Shim. "Including group-by in query optimization", VLDB dated 1994, 13 pages.

M. Eich, P. Fender and G. Moerkotte. "Faster Plan Generation through Consideration of Functional Dependencies and Keys", PVLDB, vol. 9, dated 2016, 12 pages.

M. Eich, G. Moerkotte. "Dynamic programming: The next step.", ICDE dated Oct. 2014, 45 pages.

G. Lohman. "Is query optimization a solved problem?" http://wp.sigmod.org/?p=1075, dated 2014, 6 pages.

A. Gupta, V. Harinarayan and D. Quass. "Aggregate-Query Processing in Data Warehousing Environments", VLDB dated1995, 12 pages.

* cited by examiner

FIG. 2

```
Q2   SELECT SUM(case when T1.b=4 then T2.x+1 else T2.y end),
            SUM(decode(T1.a, 5, T2.y, T2.z+3))
     FROM T1, T2
     WHERE T1.j = T2.j and T2.b > 2
     GROUP-BY T1.g;
```

402 IDENTIFY A PLURALITY OF STATES FOR THE PARTICULAR QUERY, WHEREIN EACH STATE, OF THE PLURALITY OF STATES, ASSIGNS EACH DATABASE OBJECT, OF THE PLURALITY OF QUERY DATABASE OBJECTS, TO ONE OF A PAIR OF DATABASE OBJECT SETS COMPRISING: A COALESCE SET AND A FACTOR SET, WHEREIN A PARTICULAR COALESCE SET OF A PARTICULAR STATE, OF THE PLURALITY OF STATES, INCLUDES (A) THE ONE OR MORE AGGREGATION-SOURCE DATABASE OBJECTS, AND (B) LESS THAN ALL AGGREGATION-CONDITION DATABASE OBJECTS OF THE ONE OR MORE AGGREGATION-CONDITION DATABASE OBJECTS

404 GENERATE A REWRITTEN QUERY THAT APPLIES EARLY GROUPING, BEFORE APPLYING THE PARTICULAR JOIN EXPRESSION, FOR AT LEAST ONE DATABASE OBJECT SET OF THE PAIR OF DATABASE OBJECT SETS IDENTIFIED BY THE PARTICULAR STATE

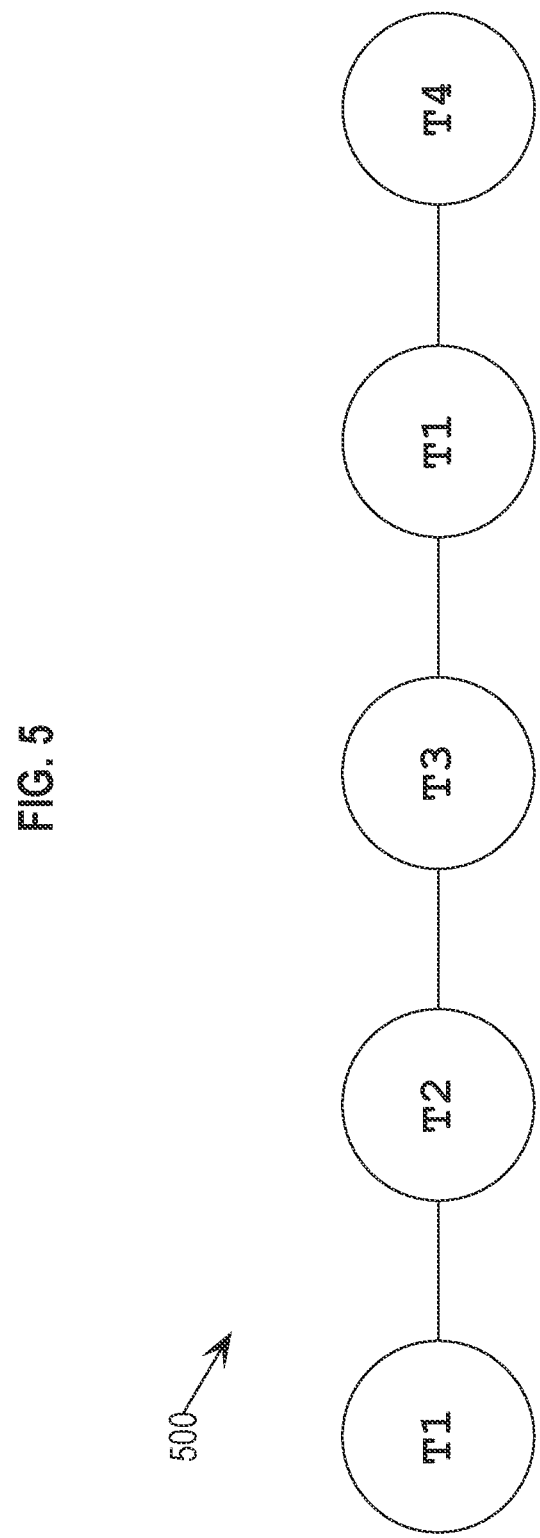

FIG. 6

| [T1 T2 T4] | {C} | {F} | Disposition of CT | Connected | Sub-States |
|---|---|---|---|---|---|
| [1 1 1] | {T1, T2, T3, T4} | ∅ | C has ALL tables of CT | C | none |
| [1 1 0] | {T1, T2, T3} | {T4} | C has ALL tables of CT | C, F | SCG, SFG, CCFG |
| [0 1 1] | {T2, T3, T4} | {T1} | C has SOME tables of CT | F | SFG |
| [0 1 0] | {T2, T3} | {T1, T4} | C has SOME tables of CT | C, F | SFG |
| [1 0 1] | {T1, T3, T4} | {T2} | C has SOME tables of CT | C, F | SFG |
| [1 0 0] | {T1, T3} | {T2, T4} | C has SOME tables of CT | C | none |
| [0 0 1] | {T3, T4} | {T1, T2} | C has NO tables of CT | F | SFG |
| [0 0 0] | {T3} | {T1, T2, T4} | C has NO tables of CT | C, F | SCG, SFG, CCFG |

602 — 604 — 606 — 608 — 610 — 612

600

EARLY GROUPING OPTIMIZATION FOR SQL STATEMENTS WITH CONDITIONAL EXPRESSIONS

RELATED APPLICATIONS

This application is related to U.S. application Ser. No. 16/797,507, titled "Partial Group By for Eager Group By Placement Query Plans", and also to U.S. application Ser. No. 17/105,255, titled "Early Grouping Optimization For SQL Statements By Normalizing Arithmetic Expressions In Aggregates", filed Nov. 25, 2020, the entire contents of each of which are incorporated by reference as if fully set forth herein.

FIELD OF THE INVENTION

The present invention relates to rewriting SQL statements using early grouping transformations, and, more specifically, to enabling wider application of early grouping transformation using conditional expression distinctions for database objects in aggregate function expressions.

BACKGROUND

Joins are very useful relational database operations, but can also be very costly. Thus, it is beneficial to optimize join queries, e.g., using query transformations. Group-by placement (GBP) refers to an array of early grouping query transformation strategies that involve pre-aggregating intermediate results by an eager group-by operation in order to reduce the input cardinality to one or more subsequent operations, such as a join operation. A final group-by operation, after the join operation, computes the final aggregate values. Early group-by evaluation may result in a significant reduction of the number of rows on which one or more group-by operators apply, as well as a reduction in the number of rows later used in the join. Hence the overall performance of the query may improve.

Nevertheless, early group-by operations incur additional costs and do not always substantially reduce the input cardinality to subsequent operations. Thus, database management systems generally employ a cost-based query transformation framework to determine the cost of a given query if various query transformations were to be used to transform the query. Using the determined costs, the framework identifies which query transformation(s), if any, should be applied to a query. In the case of GBP transformations, for a given query, the framework generates one or more group-by states that represent different group-by operations that may be used as a transformation for the query. The framework determines the cost of running the query using the various possible query states in order to evaluate whether the group-by operations represented by the states should be employed to transform the query.

Certain constructs in queries can prevent a GBP transformation from being applied to the queries. For example, a GBP transformation is generally not applicable to a query where all database objects in the query are also referred to in an aggregate function expression of the query. Furthermore, in many cases, the potential states of GBP transformation that are considered for rewriting a query are limited, even in situations where GBP is applicable.

Thus, it would be beneficial to allow GBP transformations to be applied to a wider range of queries (e.g., for queries with all database objects involved in aggregate function expressions), and to increase the number of potential states of GBP transformation that are considered for rewriting queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 2 and 3 depict aggregate function expressions of queries.

FIG. 4 depicts a flowchart for using GBP transformation to rewrite a query that comprises a plurality of query database objects.

FIG. 5 depicts a join graph for a query.

FIG. 6 depicts a table with example GBP states generated by a database server instance for a query.

DETAILED DESCRIPTION

Figure 1:
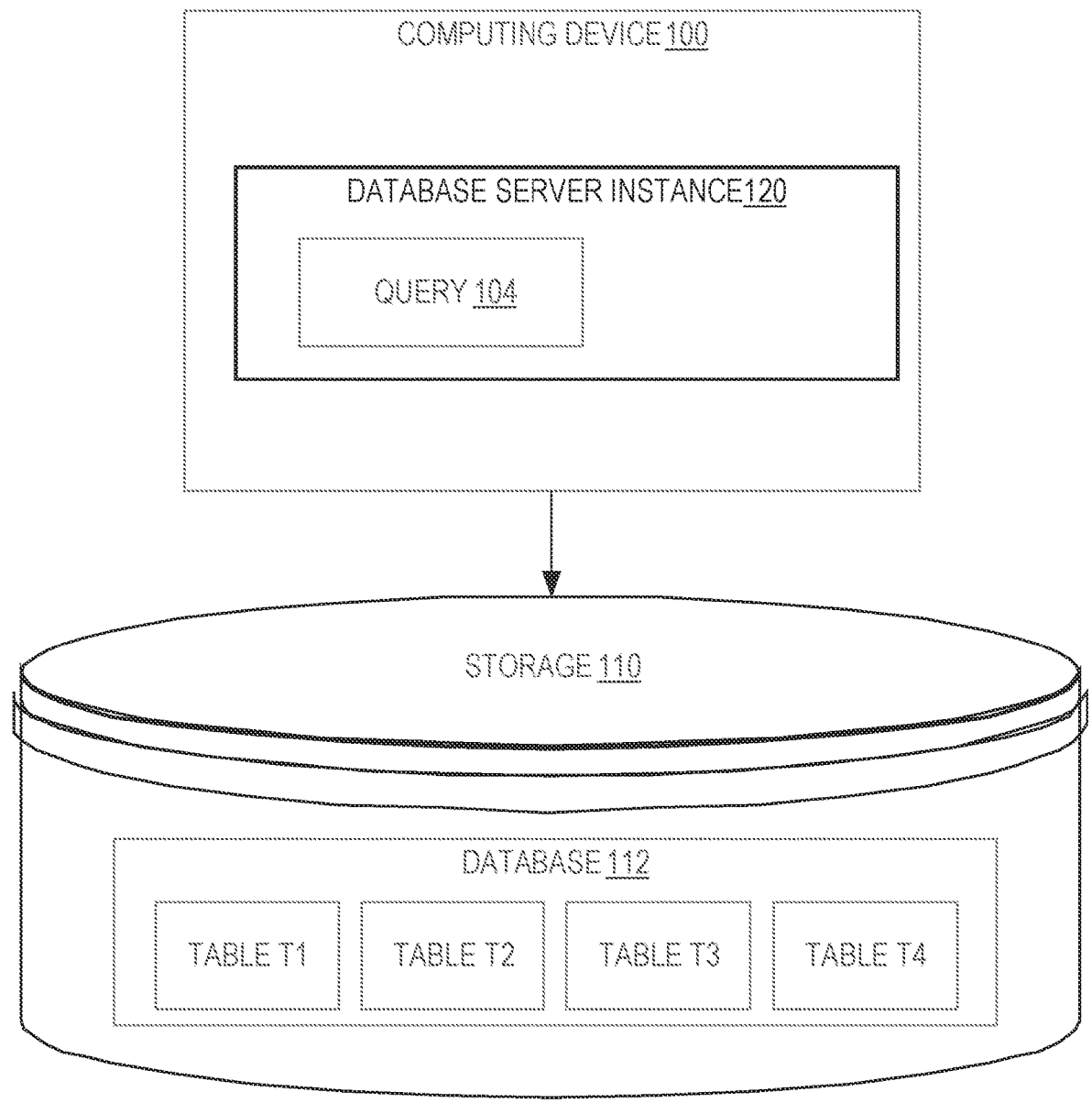
FIG. 1 depicts a block diagram of an example computing device running a database server instance of a database management system.

In the following description, for the purposes of explanation, numerous specific details are set forth in order to provide a thorough understanding of the techniques described herein. It will be apparent, however, that the techniques described herein may be practiced without these specific details. In other instances, well-known structures and devices are shown in block diagram form in order to avoid unnecessarily obscuring these techniques.

General Overview

Prior to techniques described herein, all tables referred to in aggregate function expressions within a query were considered as a group when costing potential GBP transformation-type query rewrites. However, this restricted the possible implementations of GBP transformation to configurations that used all database objects within aggregate function expressions similarly (e.g., within the same GBP view or entirely outside of any GBP view).

To increase the applicability of GBP transformations, according to embodiments described herein, database objects referred to in the aggregate function expression of a query are analyzed to determine whether any of these database objects are referred to exclusively within a condition check portion of the aggregate function expression. Such database objects may be dealt with differently than the rest of the database objects referred to in aggregate function expressions of the query. This distinction between (a) aggregation-condition database objects exclusively found in condition check portions of an aggregate function expression and (b) aggregation-source database objects within an aggregate function expression allows application of GBP transformation to a wider variety of queries and also increases the possible GBP states that can be costed for GBP transformation-eligible queries.

Thus, a DBMS that implements query rewrite may apply GBP transformations more widely to increase the efficiency of running queries that involve aggregate functions and joins, which are notoriously expensive. Such application of GBP transformation can result in significant speed improvements to client workloads, where the transformed workloads may run at speeds that are orders of magnitude faster than is achieved without the GBP transformation e.g., for workloads involving joins over very large tables.

Examples of GBP Transformations

The following is an overview of GBP transformation types, including two basic types that are described using examples that do not make a distinction between aggregation-condition database objects and aggregation-source database objects, according to prior techniques. Examples of GBP transformations herein refer to database tables (e.g., tables T1-T4 in database 112 of FIG. 1), but are not limited thereto, and may be applicable to any kind of database object.

The basic types of GBP transformations involve applying early grouping on the aggregating table(s) and/or on non-aggregating tables(s) of a query. The aggregating tables (AT) of a query are the set of tables whose columns are among the aggregate columns of the query. When the tables referred to in an aggregate function expression of a query are not connected by join expressions within the query, the AT includes a minimal set of tables needed to make the AT a connected set. The non-aggregating tables (NAT) of a query are the set of tables that do not appear in AT.

For each GBP state that is generated by the cost-based query transformation framework implemented by a database server instance (such as instance 120 of FIG. 1), one or more of the following variants are costed and the best option is chosen to be implemented as a GBP transformation to rewrite the query. The following example query Q1 is used to illustrate the concepts.

| Q1 | SELECT SUM(T1.a)<br>FROM T1, T2<br>WHERE T1.x = T2.x and T2.k > 4<br>GROUP BY T1.g; |
|---|---|

Aggregate columns of a query are columns that appear as arguments of aggregate functions, such as COUNT( ) AVG( ) SUM( ) MIN( ), and MAX( ) of an aggregate function expression in the query. The set of AT in a query are the tables with aggregate columns in the query. In the case of Q1, there is only one aggregate column (T1.a). Accordingly, Q1 has one AT (T1) and one NAT (T2).

Single-Coalesced Grouping

Query Q1A (shown below) is obtained by transforming Q1 according to a Single-Coalesced Grouping (SCG)-type GBP transformation, which applies early grouping on the AT in the query. Specifically, the transformation causes table T1 to be grouped before the join with table T2.

| Q1A | SELECT SUM(V.Sa)<br>FROM T2, (SELECT T1.x, T1.g, SUM(T1.a) Sa<br>   FROM T1<br>   GROUP BY T1.x, T1.g) V<br>WHERE V.x = T2.x and T2.k > 4<br>GROUP BY V.g; |
|---|---|

Single-Factored Grouping

Query Q1B (shown below) is obtained by transforming Q1 according to Single-Factored Grouping (SFG)-type GBP transformation, which applies early grouping on the NAT of a query. As the aggregate functions of the original query do not involve columns of the NAT, grouping on NAT will introduce "factors" by which each original aggregate needs to be multiplied. In query Q1, T2 is the only NAT, and query Q1B groups T2 before the join with table T1. For every row of T1, each group of T2 contributes to the same aggregate by a factor of its cardinality.

| Q1B | SELECT SUM(T1.a*V.Cnt)<br>FROM T1, (SELECT T2.x, COUNT(*) Cnt<br>   FROM T2<br>   WHERE T2.k > 4<br>   GROUP BY T2.x) V<br>WHERE T1.x = V.x<br>GROUP BY T1.g; |
|---|---|

Combined Coalesced Factored Grouping

Combined Coalesced Factored Grouping (CCFG) is a variant of GBP transformation that is a combination of SCG and SFG, where early grouping is applied on both AT and NAT in the query. The result of applying such a transformation to Q1 is shown in query Q1C below.

| Q1C | SELECT SUM(Vs.Sa*Vf.Cnt)<br>FROM (SELECT T1.x, T1.g, SUM(T1.a) Sa<br>   FROM T1<br>   GROUP BY T1.x, T1.g) Vs,<br>(SELECT T2.x, COUNT(*) Cnt<br>   FROM T2<br>   WHERE T2.k > 4<br>   GROUP BY T2.x) Vf<br>WHERE Vs.x = Vf.x<br>GROUP BY Vs.g; |
|---|---|

Conditional Expression Distinction in Aggregate Expressions to Enable GBP Transformations FIG. 1 depicts a block diagram of an example computing device 100 running database server instance 120 of a database management system (DBMS). According to an embodiment, computing device 100 receives, from a user, a query 104 over data in database 112 stored at persistent storage 110 and managed by database server instance 120. According to an embodiment, database 112 stores data that may be formatted as graph data, relational data, Resource Description Framework (RDF) data, etc.

According to techniques described herein, instance 120 distinguishes between: (a) aggregate-condition tables referred to within only condition check portions of an aggregate function expression of a query, where a condition check portion defines one or more conditions for the aggregate function expression; and (b) aggregate-source tables referred to within only aggregate source portions of the aggregate function expression, where an aggregate source portion defines one or more aggregate columns over which the aggregate function operates (i.e., columns that may be aggregated by the aggregate function). The aggregate-condition tables may be treated differently than the aggregate-source tables within states generated for GBP transformation, thereby increasing the applicability of GBP transformations for query rewrite. For the following discussion, the presence of a group-by clause in the original query is immaterial and techniques described herein apply to queries that have an explicit group-by clause as well as to queries that do not.

To illustrate distinguishing between aggregate-condition tables and aggregate-source tables for purposes of applying GBP transformations, computing device 100 receives a query 104 as depicted by query Q2 below:

| | |
|---|---|
| Q2 | SELECT SUM(case when T1.b=4 then T2.x+1 else T2.y end), SUM(decode(T1.a, 5, T2.y, T2.z+3)) FROM T1, T2 WHERE T1.j = T2.j and T2.b > 2 GROUP-BY T1.g; |

Query Q2 is an aggregate-bound query because all tables in the query are included in AT. Prior to the techniques described herein, GBP transformation would be rejected for aggregate-bound query Q2 because, in order to transform a query according to a GBP transformation, at least one of the query tables is required to be retained outside the GBP view (which would include all tables in the set of AT).

However, according to techniques described herein, database server instance 120 is configured to apply GBP transformations to aggregate-bound queries that include conditional expression(s), such as CASE, DECODE, NVL2, etc., inside the aggregate function(s). Specifically, according to an embodiment, GBP transformations may be applied to an aggregate-bound query when the AT tables of the query may be split into mutually-exclusive sets of aggregation-condition tables (CT) and aggregation-source tables (AST).

According to an embodiment, to evaluate transformation options for Q2, database server instance 120 determines whether the AT in query Q2 includes mutually-exclusive sets of CT and AST. Accordingly, instance 120 scans the expressions of each aggregate function in query Q2 to identify (a) condition columns occurring in condition check portions of the aggregate function expressions in the query, and (b) aggregate columns occurring in aggregate source portions of the aggregate function expressions.

FIG. 2 depicts the aggregate function expressions 200 and 210 of query Q2. Expression 200 includes a condition check portion (such as portion 202) and an aggregate source portion (such as portion 204). Similarly, expression 210 includes a condition check portion (such as portion 212) and an aggregate source portion (such as portion 214). It is noted that any given aggregate function expression may include multiple condition check portions and/or multiple aggregate source portions. To identify the CT of Q2, instance 120 identifies tables with columns appearing in only condition check portions 202 and 212. Further, to identify the AST of Q2, instance 120 identifies tables with columns appearing in only aggregation source portions 204 and 214. Identification of mutually-exclusive sets of AST and CT amounts to splitting the AT of the query into CT and AST, i.e., AT= CT ∪ AST.

It is noted that values in condition columns of a query are not returned by the aggregate function. Further, CT can appear outside of aggregate expressions in the select list of a query block, which facilitates application of GBP transformations. To illustrate, an SCG view that implements early grouping need not include any table in the CT, thereby allowing the SCG view to be joined to a database object (i.e., the table(s) themselves or a view based on the table(s)) other than the objects from which the view is derived. In other words, only the AST columns are required to be moved inside the view for an SCG transformation.

For Q2, instance 120 identifies condition columns and aggregate columns among the table columns that are included in the aggregate expression of the query as follows.

| | |
|---|---|
| SUM (case when T1.b = 4 then T2.x+1 else T2.y end) | <== Condition column <== Aggregate column <== Aggregate column |
| SUM(decode(T1.a, 5, T2.y, T2.z+3) ) | <== Condition column <== Aggregate column <== Aggregate column |

Thus, in this example, table T1 ∈ CT, and table T2 ∈ AST.

At the end of identifying all condition columns and aggregate columns in the aggregate function expression of a query, if any table includes both a condition column and an aggregate column, then the AT cannot be not split into mutually-exclusive CT and AST, and AT is treated as a unit for GBP state space generation. However, if the sets CT and AST are mutually exclusive for the query, the new state space of GBP is generated in which CT and AST may be treated independently (as described in further detail below).

Using the techniques described herein, instance 120 is able to evaluate query Q2 for early grouping (via state generation described in further detail below), and, where cost efficient, to apply early grouping to query Q2 as shown below in connection with example transformed queries Q2A, Q2B and Q2C. These transformed queries are generated by splitting the AT into CT and AST, as described above, and applying the SCG, SFG and CCFG variants of GBP transformations. It is noted that, because query Q2 is aggregate-bound, GBP transformation would not be considered for this query without identifying mutually-exclusive sets of CT and AST with which to develop the state space for the query.

By splitting AT in query Q2 into CT and AST, instance 120 may produce the following example rewritten query Q2A that performs early grouping using an SCG view V:

| | |
|---|---|
| Q2A | SELECT SUM(case when T1.b=4 then V.Sx else V.Sy end) SUM(decode(T1.a, 5, V.Sy, V.Sz)) FROM T1, (SELECT T2.j, SUM(T2.x+1) Sx, SUM(T2.y) Sy, SUM(T2.z+3) Sz FROM T2 WHERE T2.b > 2 GROUP-BY T2.j) V WHERE T1.j = V.j GROUP-BY T1.g; |

Again, by splitting AT in query Q2 into CT and AST, instance 120 may produce the following example rewritten query Q2B that performs early grouping using an SFG view V:

| | |
|---|---|
| Q2B | SELECT SUM((case when V.b=4 then T2.x+1 else T2.y end)*V.Cnt) SUM((decode(V.a, 5, T2.y, T2.z+3)*V.Cnt)) FROM T2, (SELECT T1.j, T1.a, T1.b, T1.g, COUNT(*) Cnt FROM T1 GROUP-BY T1.j, T1.a, T1.b, T1.g) V WHERE V.j = T2.j and T2.b > 2 GROUP-BY V.g; |

It is noted that the expression, "decode(V.a, 5, T2.y, T2.z+ 3)" gets multiplied by V.Cnt because, although the expression does not include any column from T1, the factor is present. Specifically, in a non-transformed query, the addition would have taken place for every row of T1.

As another example, by splitting AT in query Q2 into CT and AST, instance 120 may produce the following example rewritten query Q2C implementing CCFG, which performs early grouping using an SFG view Vf and an SCG view Vs:

| | |
|---|---|
| Q2C | SELECT SUM((case when Vf.b=4 then Vs.Sx else Vs.Sy end)*Vf.Cnt) <br> SUM((decode(Vf.a, 5, Vs.Sy, Vs.Sz)*Vf.Cnt)) <br> FROM (SELECT T1.j, T1.a, T1.b, T1.g, COUNT(*) Cnt <br>     FROM T1 <br>     GROUP-BY T1.j, T1.a, T1.b, T1.g) Vf, <br> (SELECT T2.j, <br>     SUM(T2.x+1) Sx, SUM(T2.y) Sy, SUM(T2.z+3) Sz <br> FROM T2 <br> WHERE T2.b > 2 <br> GROUP-BY T2.j) Vs <br> WHERE Vs.j = Vf.j <br> GROUP-BY Vf.g; |

Nested Conditional Expressions:

The aggregates of a query can contain arbitrarily nested conditional expressions, which, prior to techniques described herein, would prevent GBP transformations from being evaluated for the query. An example of nested conditional expressions is shown in the following query Q3:

| | |
|---|---|
| Q3 | SELECT SUM(case <br>     when (decode (T1.b, 4, T1.c, T1.a) = 5) <br>     then (case when T1.b < 5 then T2.x else T2.y end) <br>     else T3.y <br>     end), <br>     SUM(decode(T1.a, 5, T2.y, 3)) <br> FROM T1, T2 <br> WHERE T1.j = T2.j and T2.b > 2 <br> GROUP-BY T1.g; |

Figure 3:
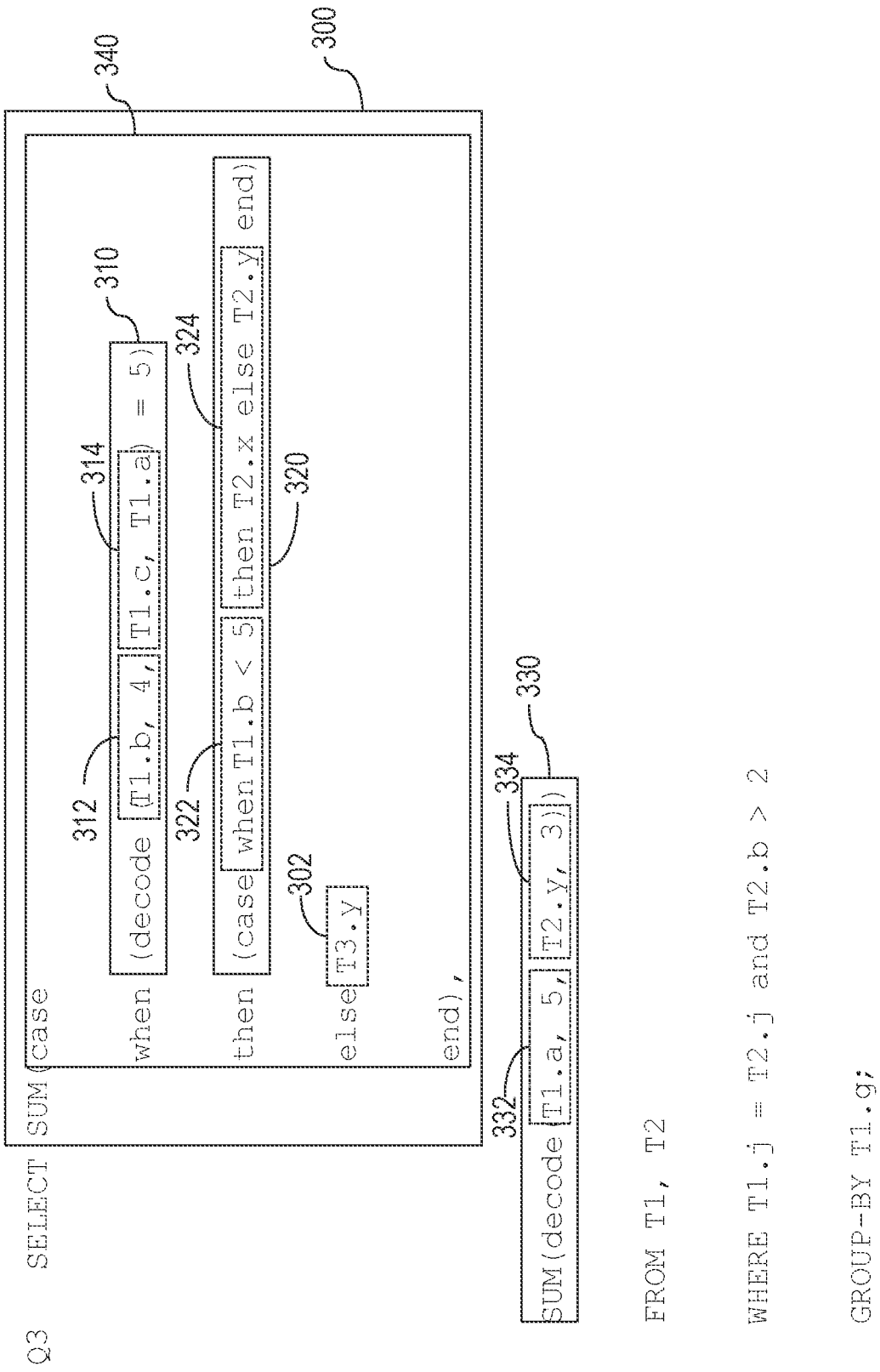

However, using techniques described herein, it is possible to apply GBP-type transformations on queries that include aggregate expressions with arbitrarily nested conditional expressions. To illustrate, instance 120 receives query Q3 and, in response to determining that the query includes nested conditional expressions, determines whether AT in the query includes mutually-exclusive CT and AST, as described above. FIG. 3 depicts aggregate expressions, including condition check portions and aggregate source portions, in query Q3. As shown in FIG. 3, query Q3 includes aggregate function expressions 300 and 330. Aggregate function expression 300 includes a conditional expression 340 that includes two nested conditional expressions 310 and 320. Because expression 310 is entirely within the "when" clause of conditional expression 340, which defines a condition for aggregation, both portions 312 and 314 are condition check portions. Further, expression 320 is within the "then" clause of conditional expression 340, which means that the result of condition expression 320 could be aggregated by the aggregation function of expression 300. Thus, condition expression 320 includes condition check portion 322 and aggregate source portion 324 identifying aggregate columns of the query. Similarly, portion 302, within the "else" clause of conditional expression 340, is an aggregate source portion. Furthermore, the non-nested conditional expression in aggregate function expression 330 includes condition check portion 332 and aggregate source portion 334.

The following is an illustration of the identification, by instance 120, of conditional columns and aggregate columns in the aggregate function expressions of query Q3:

| | |
|---|---|
| SUM (case when <br>     (decode(T1.b,4, <br>     T1.c, <br>     T1.a) = 5 <br>   then (case when T1.b < 5 <br>     then T2.x <br>     else T2.y <br>   end) <br>   else T3.y <br> end) , <br> SUM (decode(T1.a,5 <br> T2.y, <br> 3) | <== Condition column <br> <== Condition column <br> <== Condition column <br> <== Condition column <br> <== Aggregate column <br> <== Aggregate column <br><br> <== Aggregate column <br><br> <== Condition column <br> <== Aggregate column |

Instance 120 derives CT and AST from the identified condition columns and aggregate columns, respectively. In this example, instance 120 determines that table T1 ∈ CT, and tables T2 and T3 ∈ AST. Thus, query Q3 may be transformed using a GBP transformation that distinguishes between CT and AST within the query, depending on cost as described in further detail below.

State Space and Validity

In order to evaluate a query for GBP transformation, which is a cost-based transformation, instance 120 generates multiple "states" for the query, where each state represents a potential configuration for early grouping. To illustrate, when instance 120 receives a request to run a query 104 over database 112, instance 120 evaluates different ways that the query might be rewritten in order to increase the efficiency of running the query. If the query is eligible for GBP transformation, instance 120 generates one or more GBP states for the query. Instance 120 determines the cost of one or more potential implementations of the generated states, and the cheapest potential GBP implementation is identified. The transformation represented by the selected GBP implementation is used to rewrite the query if it is determined that the transformation is worth any additional cost.

More particularly, each GBP state generated for a query divides the tables in the query into two sets: a coalesce set of tables referred to as {C} and a factor set of tables referred to as {F}. In any implementation generated based on a given state, the tables in each set {C} and {F} are treated as units, where the tables in each set are either all in the same view or are all outside of a view. Specifically, there are multiple possible implementations for each state: the tables included in {C} could be pushed into an SCG view while the tables in {F} are maintained outside the view; the tables in {F} could be pushed into an SFG view while the tables in {C} are maintained outside the view, or both SCG and SFG views could be created to produce a CCFG-type state implementation.

The "state space" of GBP transformation for a given query is the set of all possible valid GBP states of the query. Instance 120 determines whether each generated state is a "valid" state using one or more validity rules. Application of validity rules as a condition of inclusion in the state space to be explored for a given query reduces the number of states that must be costed, which reduces the overall cost of implementing GBP transformations. Validity rules generally exclude states that (a) would give incorrect results, or (b) have the potential to be expensive to execute. As an example of a validity rule, in a valid state, the joins between sets {C} and {F} are equi-joins.

Further, according to another example validity rule, in order for a state to be considered valid, the join graph of the query block must show that the tables in any table set ({C} and {F}) of the state, which is to be included in a GBP view, are connected. Specifically, in a join graph for a query, each table in the query is represented by a vertex and each join condition in the query is represented by an edge between applicable vertices. For example, a join condition in an example query being evaluated is T1.$x$=T2.$y$, and, as such, the join graph for the query carries an edge between vertices representing table T1 and table T2. A subset of a join graph is considered connected if there exists one vertex from which all other vertices in the subset are reachable by traversing the edges. Any state in which a sub-graph for one of {C} or {F} is disconnected, where the disconnected set is to be included in a GBP view, is pruned from the state space for the query, i.e., the state is determined not to be valid.

Condition Table Distinction

Prior to embodiments described herein, in order for a state to be valid, at least all tables in AT are included in {C}, but all tables of the query cannot be in {C}. It is noted that, based on this rule, the maximum number of states that can be generated is $3*2^N$ where N is the number of tables that do not belong to AT.

According to an embodiment, the above validity rule is changed to make a distinction between CT and AST in the AT of a query when condition expressions are present in the aggregate function expressions of a query. Thus, according to techniques described herein, instead of {C} being required to be a superset of AT, {C} must be a superset of AST (but not necessarily a strict superset of AST). According to this adjusted validity rule, a valid GBP state need not include, in {C}, all of CT for the query. This adjusted requirement expands the applicability of GBP transformations to nested conditional queries and aggregate-bound queries indicated above. Furthermore, this adjusted requirement potentially expands the number of states that are able to be generated, even for queries that are not aggregate-bound or that do not contain nested conditional queries, such that the maximum number of states that can be generated is $3*2^{N'}$ where N' is the number of tables that do not belong to AST.

FIG. 4 depicts a flowchart 400 for using GBP transformation to rewrite a particular query that comprises a plurality of query database objects, where the particular query references, in one or more aggregation expressions, a plurality of aggregation database objects that comprises one or more aggregation-condition database objects and one or more aggregation-source database objects, and where the particular query includes a particular join expression.

At step 402 of flowchart 400, a plurality of states are identified for the particular query, wherein each state, of the plurality of states, assigns each database object, of the plurality of query database objects, to one of a pair of database object sets comprising: a coalesce set and a factor set, wherein a particular coalesce set of a particular state, of the plurality of states, includes (a) the one or more aggregation-source database objects, and (b) less than all aggregation-condition database objects of the one or more aggregation-condition database objects. For example, the instance 120 receives a request to run the following query Q4 over tables T1, T2, T3 and T4 in database 112:

| Q4 | SELECT SUM(case when T1.b=4 then T3.x+1 else T3.y end), SUM(decode(T2.a, 5, T3.y, T3.z+3)) FROM T1, T2, T3, T4 WHERE T1.j = T2.j and T2.x = T3.x and T1.y = T3.y and T4.z = T1.z and T2.b > 2 GROUP-BY T1.g; |
|---|---|

In query Q4, tables T1 and T2 ∈ CT, and table T3 ∈ AST. FIG. 5 depicts the join graph 500 for query Q4, which shows edges between table vertices according to the join conditions in query Q4.

In response to receiving the request to run query Q4, instance 120 determines the GBP state space for the query. A few example states, of the plurality of states generated by instance 120 for query Q4, are shown in table 600 of FIG. 6, where each row represents a different example state. It is noted that query Q4 does not include nested conditionals and is not aggregate-bound. However, if all of AT were required to be in {C}, then the only valid states for Q4 indicated in table 600 are [1 1 1] and [1 1 0]. As illustrated in table 600, the number of valid states that are able to be included in the state space for query Q4 based on conditional table distinction is much greater than the two states that are generated when all of AT is required to be in {C}.

Nevertheless, because all of AST (i.e., table T3) in query Q4 is required to be in {C} for any valid state of the query, the states in table 600 are limited to those table division schemes that include table T3 in {C}. Accordingly, the different states are generated by identifying different configurations of T1, T2, and T4 to be included in {C}, as indicated by the state identifiers in column 602. For example, state [1 1 1] includes each of T1, T2, and T4 (as well as T3) in {C} (as shown in column 604), which leaves {F} with an empty set (as shown in column 606). As another example, state [1 1 0] includes tables T1 and T2 (as well as T3) in {C}, which leaves table T4 in {F}. Column 608 indicates the disposition of the CT tables, i.e., whether each state includes, in {C}: (a) all of CT; (b) none of CT; or (c) some, but less than all, of CT.

Generation of Sub-States

After generating the state space for a given query, possible implementations of each state (referred to as "sub-states") are generated, where a sub-state for a given state defines one of an SCG, an SFG, or a CCFG-based GBP transformation for the query based on {C} and {F} of the state.

According to an embodiment, sub-states are selectively generated and costed for a given state based on the configuration of tables in CT in the state. Specifically, all possible sub-states are generated for a given valid state when the state conforms to one of the following rules: {C} contains all tables of CT (i.e., {C} ⊇ CT ∪ AST); or {C} contains no tables of CT (i.e., {C} ∩ CT=∅). However, if, for a given state, {C} contains a strict subset (i.e., some but not all) tables of CT (i.e., ({C} ∩ CT) ⊂ CT), only a sub-state that defines an SFG transformation is generated for that state.

Specifically, in one option, all the condition tables are retained outside SCG view for {C}, which ensures all condition checks are done after grouping (i.e., they are evaluated once for each group). In another option, all condition tables are moved inside SCG view for {C}, which ensures the entire conditional aggregate can be computed in the SCG view. In another option, some tables of CT are included in {C}, and the SCG view could only do the aggregation partially as all CT tables are not in {C}. In this case, in order to avoid partially splitting the conditional aggregate and to limit additional grouping keys that would need to be introduced in this case, only the sub-state creating the SFG view is considered.

Selective generation of sub-states limits the increase in state space occasioned by the ability to distinguish between CT and AST of the AT in a query. Specifically, {C} may contain any subset of tables that belong to CT (where the complement of the subset of CT are assigned to {F}). If there are K tables in CT, then there are $2^K$ subsets (and as many possible states) assignable to {C}. If sub-states for all of {C}, {F}, and {C}+{F} could be generated for each possible state of a query generated using conditional table distinction, the query state space and the cost of evaluating a GBP transformations for a query would increase significantly. Nevertheless, according to an embodiment, the above constraints are relaxed to allow more sub-states, when necessary, or when there is room to explore sub-states more exhaustively.

Returning to a discussion of example query Q4, states of which are illustrated in table 600 of FIG. 6, column 612 indicates which sub-state(s) are generated for each state. For example, state [1 1 1] includes all of the CT tables in {C} and leaves nothing in {F}. Because {F} is empty, no sub-states are generated for state [1 1 1], as shown in column 612. As another example, state [0 1 1] has some, but not all, of the CT tables in {C}. As such, based on the sub-state generation rules indicated above, instance 120 could generate an SFG-type sub-state for state [0 1 1] (but not any sub-states involving SCG-type views). The tables of {F} are connected (as indicated in column 610), and, as such, the SFG-type sub-state is generated for the state.

It is noted that column 610 of the table indicates which of {C} and {F} of each state are connected, according to join graph 500 (FIG. 5). When a particular set of a state is not connected, no sub-states with a view based on the unconnected set are generated, which avoids the need to perform costly operations for sets that are not joined (just as cross products). For example, state [1 0 0] has some, but not all, of the CT tables in {C}. As such, based on the sub-state generation rules indicated above, instance 120 could generate an SFG-type sub-state for the state. However, as indicated in column 610, only {C} is connected and {F} is not connected. Specifically, in this state, {F} includes tables T2 and T4 and, as shown in graph 500, table T2 is not directly connected to table T4. It is noted that the tables in {C} (T1 and T3) are directly connected by an edge, which means that {C} is a connected set. Because {F} is not connected, and the state is not eligible to generate any views based on {C}, instance 120 does not generate any sub-states for state [1 0 0].

As yet another example, state [0 0 1] includes no CT tables in {C}. As such, instance 120 could potentially generate all three possible sub-states (SCG, SFG, and CCFG) for the state. However, {C} is not connected for state [0 0 1]. As such, only the SFG sub-state is generated for state [0 0 1]. Though not shown in table 600, it is possible for only an SCG sub-state to be generated for a given state, i.e., when {C} for the state has all or none of the CT tables, and where {C} is connected and {F} is not connected.

Modifying the Aggregate

Returning to a discussion of flowchart 400, at step 404, a rewritten query is generated, where the rewritten query applies early grouping, before applying the particular join expression, for at least one database object set of the pair of database object sets identified by the particular state. For example, instance 120 costs all sub-states generated for query Q4 based on the valid states in the state space. Instance 120 selects a particular sub-state with the lowest projected cost, and rewrites the query based on the selected sub-state.

According to an embodiment, when a generated state includes all CT tables in {C} (i.e., {C} includes all AT tables), the entire conditional aggregate is moved to the select list inside any SCG view that is generated by the rewritten query. For instance, for state [1 1 0], in which all CT tables are included in {C}, the entire aggregate expression is moved into the SCG view select list for sub-states that include an SCG view. Thus, early grouping is implemented in the SCG view prior to any join expression in the rewritten query.

To illustrate, for query Q4, instance 120 selects the SCG-type sub-state for state [1 1 0] as the lowest-cost transformation. Accordingly, instance 120 generates the following rewritten query Q4A, from query Q4, based on the selected sub-state:

Q4A    SELECT SUM(V.Sz), SUM(V.Sy)
       FROM T4, (SELECT T1.z, T1.g, SUM(case when T1.b=4
       then T3.x+1 else
            T3.y end) Sz, SUM(decode(T2.a, 5,
            T3.y, T3.z+3)) Sy
       FROM T1, T2, T3
       WHERE T1.j = T2.j
         and T2.x = T3.x
         and T1.y = T3.y
         and T2.b > 2
       GROUP-BY T1.z;) V
       WHERE T4.z = V.z
       GROUP-BY V.g;

According to an embodiment, when a generated state includes no CT tables in {C}, the conditional aggregate is retained outside any generated SCG view. Instead, simple aggregates are generated for the return values of the conditional expression and these simple aggregates are added to the SCG view. The evaluation of the condition itself is done outside the SCG view.

For example, instance 120 selects the SCG-type sub-state for state [0 0 0] as the lowest-cost transformation for query Q4. Accordingly, based on the selected sub-state, instance 120 splits the aggregate function expression of Q4 as follows:

Simple aggregates are added to SCG view V's select list as follows:
   SUM(T3.x+1) Sx, SUM(T3.y) Sy, SUM(T3.z+3) Sz
The two aggregates in the outer query block (with respect to the SCG view, V) are modified as follows:
   SUM(case when T1.b=4
        then V.Sx else V.Sy)
   SUM(decode(T2.a, 5, V.Sy, V.Sz))

Accordingly, instance 120 generates rewritten query Q4B, which is an SCG-type query rewrite for query Q4 based on state [0 0 0], as follows:

Q4B    SELECT SUM(case when T1.b=4 then V.Sx else V.Sy end),
            SUM(decode(T2.a, 5, V.Sy, V.Sz))
       FROM T1, T2, T4, (SELECT T3.x, T3.y, SUM(T3.x+1) Sx,
       SUM(T3.y)
            Sy, SUM(T3.z+3) Sz
            FROM T3
            GROUP-BY T3.x, T3.y) V
       WHERE T1.j = T2.j
         and T2.x = V.x
         and T1.y = V.y
         and T4.z = T1.z
         and T2.b > 2
       GROUP-BY T1.g;

According to an embodiment, when a generated state includes some, but not all, CT in {C} (such as with states [0 1 1], [1 0 1]), the conditional aggregate expression is retained in the outer query block and the relevant tables in {F} are moved to an SFG view.

To illustrate, instance 120 determines that the lowest-cost sub-state for query Q4 is the SFG sub-state generated for state [0 1 1]. Accordingly, instance 120 rewrites query Q4 to produce query Q4C according to the selected sub-state as follows:

```
Q4C    SELECT SUM((case when V.b=4 then T3.x+1 else
       T3.y end)*V.Cnt),
              SUM(decode(T2.a, 5, T3.y, T3.z+3)*V.Cnt)
       FROM T2, T3, T4, (SELECT T1.j, T1.y, T1.b, T1.z,
       T1.g, COUNT(*)
                 Cnt
              FROM T1
              GROUP-BY T1.j, T1.y, T1.z, T1.b, T1.g) V
       WHERE V.j = T2.j
           and T2.x = T3.x
           and V.y = T3.y
           and T4.z = V.z
           and T2.b > 2
       GROUP-BY V.g;
```

After rewriting query Q4 based on the selected sub-state, instance 120 runs the rewritten query and returns the results of the rewritten query as results for the original query Q4. Instance 120 may run the rewritten query with any number of other optimizations, as determined by the DBMS for the query.

Database Overview

Embodiments of the present invention are used in the context of database management systems. Therefore, a description of an example DBMS is provided.

Generally, a server, such as a database server, or application is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected vertices that share access to the same database. Typically, the vertices are interconnected via a network and share access, in varying degrees, to shared storage, e.g. shared access to a set of disk drives and data blocks stored thereon. The vertices in a multi-node database system may be in the form of a group of computers (e.g., workstations, personal computers) that are interconnected via a network. Alternately, the vertices may be the vertices of a grid, which is composed of vertices in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple vertices in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary for database 112 may comprise multiple data structures that store database metadata, which is a representation of the physical schema of a data store. A database dictionary may, for example, comprise multiple files and tables. Portions of the data structures may be cached in main memory of a database server. When a database object is said to be defined by a database dictionary, the database dictionary contains metadata that defines properties of the database object (which are the physical properties of the database object). For example, metadata in a database dictionary defining a database table may specify the column names and datatypes of the columns, and one or more files or portions thereof that store data for the table. Metadata, reflecting the physical schema of database 112, stored in the database dictionary, may define a procedure, which may be the physical counterpart to a logical relationship represented in a data model. The physical metadata for the procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other physical schema properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Query Optimization and Execution Plans

Query optimization generates one or more different candidate execution plans for a query, which are evaluated by the query optimizer to determine which execution plan should be used to compute the query.

Execution plans may be represented by a graph of interlinked vertices, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e., one for which a potentially more efficient and less costly execution plan can be generated. Examples of query transformation include view merging, subquery unnesting, predicate move-around and pushdown, common subexpression elimination, outer-to-inner join conversion, materialized view rewrite, and star transformation.

A database client, not depicted in FIG. 1, connects to a database system that comprises database server instance 120. The client may comprise a database application running on a client node. The client interacts with database server instance 120 by submitting commands that cause the instance to perform operations on data stored in the database. For example, a command may be a request to access or modify data from the database, perform operations on the data, and/or return the data to the client.

According to an embodiment, device 100 may be a single device implementing the database system, or may be part of a cluster of machines, known as vertices, each running a database server instance. A database server instance (or "instance") is a server that comprises a combination of the software and allocation of resources from a machine node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. When the database system is a multi-node system, instances of the database system, such as database server instance 120, collectively implement server-side functions of the distributed database system.

Database 112 stores database data in any format, such as graph, RDF, relational, etc. Database 112 may reside in volatile and/or non-volatile storage, including persistent storage 110 or volatile memory of computing device 100. Each node implementing a multi-node database system may include a virtual disk and/or a set of physical disks. Additionally, or alternatively, database 112 may be stored, at least in part, in main memory of a database server computing device.

Database data may be stored in any type of computer-readable storage media, such as flash storage or non-volatile memory. In some embodiments, database 112 stores data for a distributed database that comprises a plurality of databases each stored in a respective one or more storage media. In other embodiments, machines implementing the database system have shared access to at least a portion of database data via shared access to storage storing database data.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
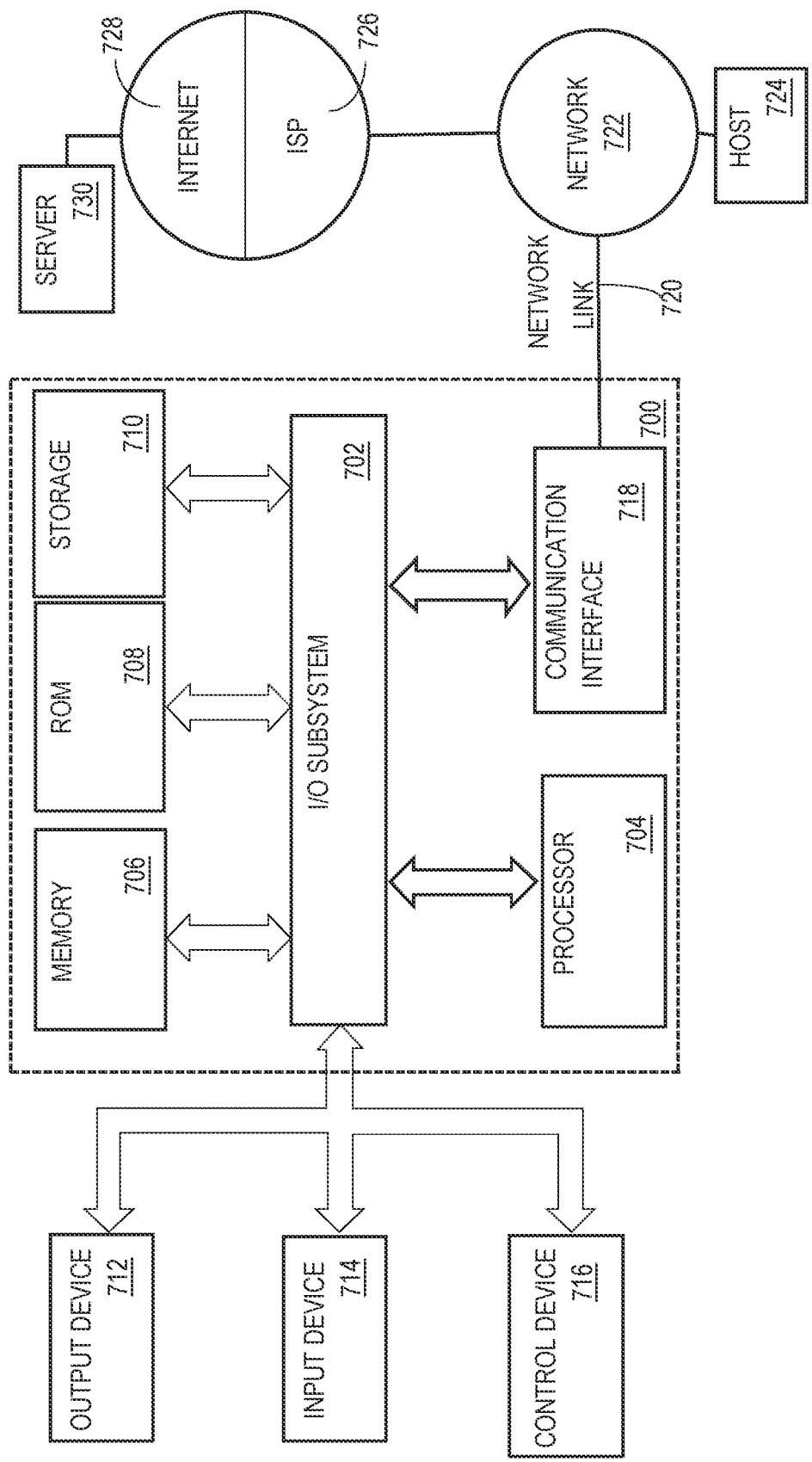
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
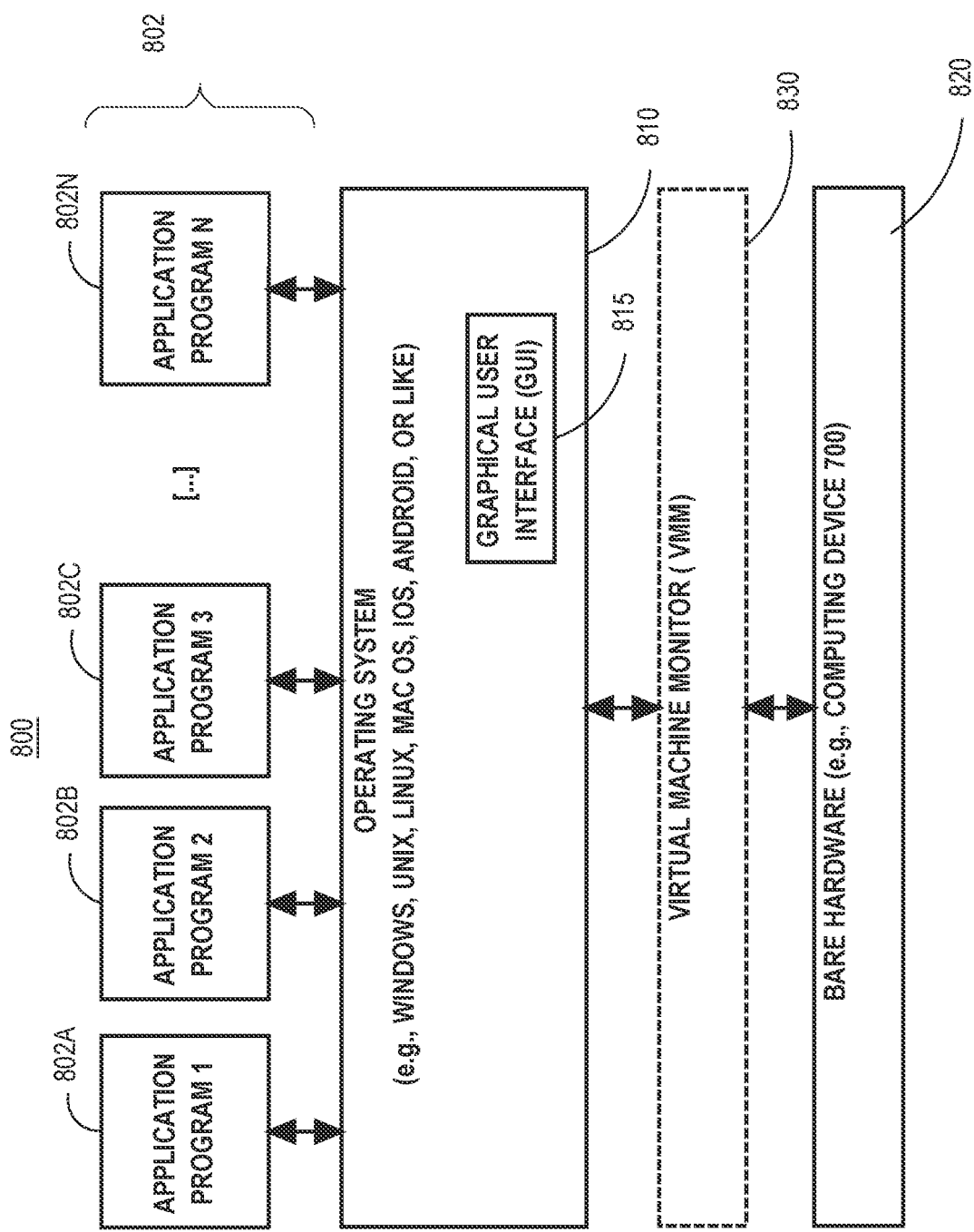
FIG. 8 is a block diagram of a basic software system that may be employed for controlling the operation of a computer system.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   rewriting a particular query that references a plurality of query database objects;
   wherein the particular query references, in one or more aggregation expressions, a plurality of aggregation database objects that comprises one or more aggregation-condition database objects and one or more aggregation-source database objects;
   wherein the particular query includes a particular join expression;
   wherein rewriting the particular query comprises:
      identifying a plurality of states for the particular query, wherein each state, of the plurality of states, assigns each database object, of the plurality of query database objects, to one of a pair of database object sets comprising: a coalesce set and a factor set,
      wherein a particular coalesce set of a particular state, of the plurality of states, includes (a) the one or more aggregation-source database objects, and (b) less than all aggregation-condition database objects of the one or more aggregation-condition database objects, and
      generating a rewritten query that applies early grouping, before applying the particular join expression, for at least one database object set of the pair of database object sets identified by the particular state.

2. The computer-executed method of claim 1, wherein each aggregation-condition database object, of the one or more aggregation-condition database objects, appears in one or more condition check portions of the one or more aggregation expressions.

3. The computer-executed method of claim 1, wherein each aggregation-source database object, of the one or more aggregation-source database objects, appears in one or more aggregation source portions of the one or more aggregation expressions.

4. The computer-executed method of claim 1, wherein the one or more aggregation-condition database objects are distinct from the one or more aggregation-source database objects.

5. The computer-executed method of claim 1, further comprising:
   generating one or more sub-states;
   wherein each sub-state, of the one or more sub-states, indicates generation of one or more views corresponding to one or more of the pair of database object sets identified by said each state;
   wherein generating the one or more sub-states comprises:
      determining whether the coalesce set, identified by said each state, includes a strict subset of the one or more aggregation-condition database objects, and
      responsive to determining that the coalesce set, identified by said each state, includes a strict subset of the one or more aggregation-condition database objects, generating, for said each state, a single sub-state that indicates generation of a single view involving one or more database objects of the factor set of said each state; and
   selecting a sub-state, of the one or more sub-states, for query rewrite;
   wherein generating a rewritten query is based on the selected sub-state.

6. The computer-executed method of claim 1, further comprising:
   generating one or more sub-states;
   wherein each sub-state, of the one or more sub-states, indicates generation of one or more views corresponding to one or more of the pair of database object sets identified by said each state;
   wherein generating the one or more sub-states comprises:
      determining whether the coalesce set, identified by said each state, includes either all of the one or more aggregation-condition database objects or none of the one or more aggregation-condition database objects, and
      responsive to determining that the coalesce set, identified by said each state, includes either (a) all of the one or more aggregation-condition database objects, or (b) none of the one or more aggregation-condition database objects, generating, for said each state, each of:
         a first sub-state that indicates generation of a single view involving one or more database objects of the factor set of said each state,
         a second sub-state that indicates generation of a single view involving one or more database objects of the coalesce set of said each state, and
         a third sub-state that indicates generation of both: a first view involving the one or more database objects of the factor set of said each state, and a second view involving the one or more database objects of the coalesce set of said each state; and
   selecting a sub-state, of the one or more sub-states, for query rewrite;
   wherein generating a rewritten query is based on the selected sub-state.

7. The computer-executed method of claim 1, wherein generating the rewritten query that applies the early grouping, before applying the particular join expression, comprises generating the rewritten query that applies the early grouping for one or more database objects of the coalesce set.

8. The computer-executed method of claim 1, wherein generating the rewritten query that applies the early grouping, before applying the particular join expression, comprises generating the rewritten query that applies the early grouping for one or more database objects of the factor set.

9. The computer-executed method of claim 1, wherein generating the rewritten query that applies the early grouping, before applying the particular join expression, comprises generating the rewritten query that applies the early grouping for both for one or more database objects of the coalesce set and for one or more database objects of the factor set.

10. One or more non-transitory computer-readable media storing one or more sequences of instructions that, when executed by one or more processors, cause:
   rewriting a particular query that references a plurality of query database objects;
   wherein the particular query references, in one or more aggregation expressions, a plurality of aggregation database objects that comprises one or more aggregation-condition database objects and one or more aggregation-source database objects;
   wherein the particular query includes a particular join expression;
   wherein rewriting the particular query comprises:
      identifying a plurality of states for the particular query, wherein each state, of the plurality of states, assigns each database object, of the plurality of query database objects, to one of a pair of database object sets comprising: a coalesce set and a factor set,
      wherein a particular coalesce set of a particular state, of the plurality of states, includes (a) the one or more aggregation-source database objects, and (b) less than all aggregation-condition database objects of the one or more aggregation-condition database objects, and
      generating a rewritten query that applies early grouping, before applying the particular join expression, for at least one database object set of the pair of database object sets identified by the particular state.

11. The one or more non-transitory computer-readable media of claim 10, wherein each aggregation-condition database object, of the one or more aggregation-condition database objects, appears in one or more condition check portions of the one or more aggregation expressions.

12. The one or more non-transitory computer-readable media of claim 10, wherein each aggregation-source database object, of the one or more aggregation-source database objects, appears in one or more aggregation source portions of the one or more aggregation expressions.

13. The one or more non-transitory computer-readable media of claim 10, wherein the one or more aggregation-condition database objects are distinct from the one or more aggregation-source database objects.

14. The one or more non-transitory computer-readable media of claim 10, wherein the one or more sequences of instructions further comprise instructions that, when executed by one or more processors, cause:
   generating one or more sub-states;
   wherein each sub-state, of the one or more sub-states, indicates generation of one or more views corresponding to one or more of the pair of database object sets identified by said each state;
   wherein generating the one or more sub-states comprises:
      determining whether the coalesce set, identified by said each state, includes a strict subset of the one or more aggregation-condition database objects, and
      responsive to determining that the coalesce set, identified by said each state, includes a strict subset of the one or more aggregation-condition database objects, generating, for said each state, a single sub-state that indicates generation of a single view involving one or more database objects of the factor set of said each state; and
   selecting a sub-state, of the one or more sub-states, for query rewrite;
   wherein generating a rewritten query is based on the selected sub-state.

15. The one or more non-transitory computer-readable media of claim 10, wherein the one or more sequences of instructions further comprise instructions that, when executed by one or more processors, cause:
   generating one or more sub-states;
   wherein each sub-state, of the one or more sub-states, indicates generation of one or more views corresponding to one or more of the pair of database object sets identified by said each state;
   wherein generating the one or more sub-states comprises:
      determining whether the coalesce set, identified by said each state, includes either all of the one or more aggregation-condition database objects or none of the one or more aggregation-condition database objects, and
      responsive to determining that the coalesce set, identified by said each state, includes either (a) all of the one or more aggregation-condition database objects, or (b) none of the one or more aggregation-condition database objects, generating, for said each state, each of:
         a first sub-state that indicates generation of a single view involving one or more database objects of the factor set of said each state,
         a second sub-state that indicates generation of a single view involving one or more database objects of the coalesce set of said each state, and
         a third sub-state that indicates generation of both: a first view involving the one or more database objects of the factor set of said each state, and a second view involving the one or more database objects of the coalesce set of said each state; and
   selecting a sub-state, of the one or more sub-states, for query rewrite;
   wherein generating a rewritten query is based on the selected sub-state.

16. The one or more non-transitory computer-readable media of claim 10, wherein generating the rewritten query that applies the early grouping, before applying the particular join expression, comprises generating the rewritten query that applies the early grouping for one or more database objects of the coalesce set.

17. The one or more non-transitory computer-readable media of claim 10, wherein generating the rewritten query that applies the early grouping, before applying the particular join expression, comprises generating the rewritten query that applies the early grouping for one or more database objects of the factor set.

18. The one or more non-transitory computer-readable media of claim 10, wherein generating the rewritten query that applies the early grouping, before applying the particular join expression, comprises generating the rewritten query that applies the early grouping for both for one or more database objects of the coalesce set and for one or more database objects of the factor set.

* * * * *